Aug. 30, 1932.                    E. GIEBE ET AL                       1,874,960
                           MEANS FOR VIBRATING CRYSTALS
                        Original Filed Jan. 20, 1928    2 Sheets-Sheet 1
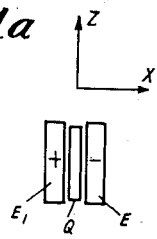
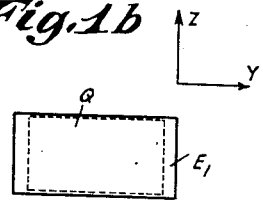
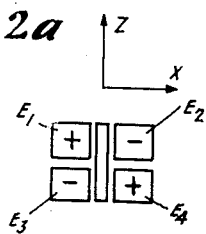
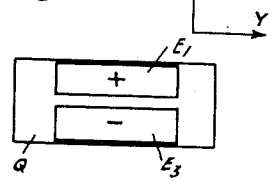
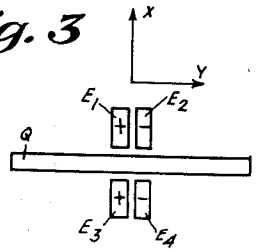
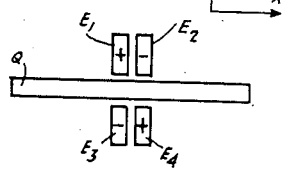
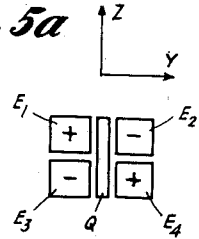
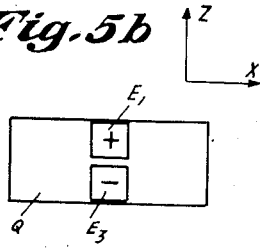
                                            INVENTORS
                                            ERICH GIEBE
                                         BY ADOLF SCHEIBE
                                            ATTORNEY Aug. 30, 1932.    E. GIEBE ET AL    1,874,960
MEANS FOR VIBRATING CRYSTALS
Original Filed Jan. 20, 1928    2 Sheets-Sheet 2
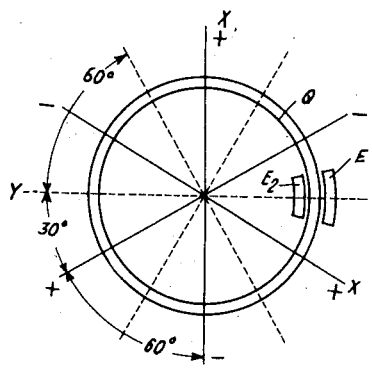
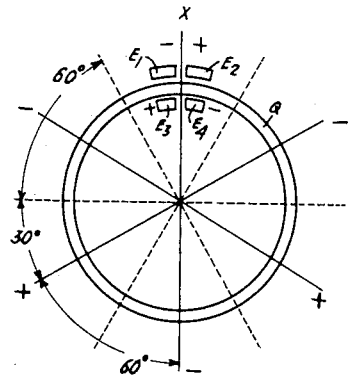
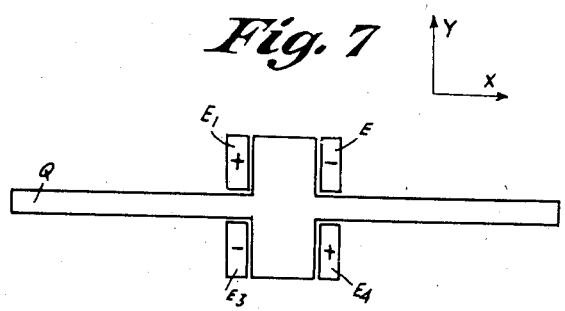
INVENTORS
ERICH GIEBE
ADOLF SCHEIBE
BY
ATTORNEY Patented Aug. 30, 1932

1,874,960

UNITED STATES PATENT OFFICE

ERICH GIEBE AND ADOLF SCHEIBE, OF BERLIN, GERMANY, ASSIGNORS TO RADIO CORPORATION OF AMERICA, A CORPORATION OF DELAWARE

MEANS FOR VIBRATING CRYSTALS

Original application filed January 20, 1928, Serial No. 248,145, and in Germany January 28, 1927. Divided and this application filed June 25, 1930. Serial No. 463,805.

This application is a division of our copending application 248,145, filed in the United States Patent Office January 20, 1928, and in Germany January 28, 1927. Our copending United States patent application Number 248,145 is directed in general towards the production of oscillations by the use of a loaded crystal whereby the same vibrates less rapidly than would be the case without the loading.

All of the methods adapted to produce piezo-electrically, elastic vibrations in crystals, are based upon the fact that an alternating electric field cutting across the crystal, by virtue of the reciprocal piezo-electric effect, sets up periodical dilatations and compressions. In other words, expansional or longitudinal oscillations of the crystal are caused whose amplitude is large as soon as the frequency of the exciting field is in agreement or tune with the frequency of one of the longitudinal natural oscillations which may be either the fundamental or a harmonic of the crystal.

Contradistinct therefrom, according to the present invention, flexural (transversal vibrations) and torsional vibrations are used. The particular means whereby vibrations of this sort are induced constitute the subject-matter of the present invention which shall be explained hereinafter with the aid of the accompanying drawings in which:

Figs. 1a and 1b show a known method of mounting a crystal so as to set it into longitudinal vibration;

Figs. 2a and 2b show a method according to my invention for causing a crystal to vibrate flexurally;

Figs. 3 and 4 exemplify other arrangements for causing the crystal to vibrate flexurally, the crystals in these arrangements extending materially beyond the electrodes, which extensions by virtue of the loading effects on the crystals will cause them to vibrate at lower frequencies;

Figs. 5a and 5b are end and plan views respectively of an arrangement for causing torsional oscillations in a crystal;

Figs. 6a and 6b show arrangements to induce transverse vibrations in a crystalline ring; and Fig. 7 is another arrangement for producing transverse vibrations in a crystal.

The essential feature of the present invention shall first be explained by a number of arrangements cited by way of example. The piezo-electric material shall be assumed to consist of rock crystal, for example, quartz, of the simplest possible geometrical form, i. e., a rod of rectangular cross-section, although it should be noted that, so far as the essential features of this invention are concerned, the form and nature of the crystal are immaterial. The three axes of the rock crystal shall be designated as follows: (A) optical axis in the direction of Z, (B) the three secondary axes as electrical axes, and the direction of one of these secondary axes as the X-axis, and (C) the three axes extending in the same plane as those mentioned in (B), though intersecting these latter everywhere at the same angle (see Fig. 6a) are the neutral axes, and the direction of one thereof as the Y-direction.

The three directions X, Y, Z constitute a rectangular coordinate system.

To more clearly understand what follows, a sketch is first shown in Figs. 1a and 1b of a known arrangement for the purpose of inducing longitudinal vibrations. The same represents essentially a condenser comprising the field-generating coats or armatures or electrodes E1 and E2, and the quartz rod Q, whose orientation can be seen from the coordinate system X, Y, Z, shown conjointly therewith, constituting the dielectric.

The effect of the electrical field, that is, reciprocal piezo-electric effect, consists here of a dilatation of the rod in the Y-axis and a simultaneous compression in the X-axis, or vice versa. The electrical field in this arrangement is homogeneous, both in each constituent cross-section as well as throughout the length of the rod. As a result, longitudinal vibrations are set up. However, even if the electrodes E1 and E2 are shorter than the length of the rod, so that, for instance, they cover only a small fraction of the length of the rod (see e. g., the arrangements of E. Giebe and A. Scheibe published in Elektrotechnische Zeitschrift vol. 47, p. 380, 1926) so that the field is no longer homogeneous, the electrical field inside each cross-section is everywhere appreciably equal as regards intensity and direction, and it changes from one section to another only in intensity, while the direction remains everywhere appreciably the same. The small volume element between the short electrodes of the rod is therefore uniformly deformed at each point, with the result that only longitudinal vibrations can be produced.

(1). An arrangement adapted to produce piezo-electrically, flexural vibrations according to the disclosures of the present invention is shown by way of example in Figs. 2a and 2b. The orientation of the quartz rod with relation to the crystal axes is the same as in the known arrangements illustrated in Figs. 1a and 1b. However, instead of two electrodes as in Figs. 1a and 1b, four electrodes E1 to E4 are here used which are connected in pairs in a way as indicated by polarity signs + and −, and which are brought to an alternating potential source. By means of such an arrangement and mode of connection of the electrodes, there arises a non-uniform electrical field such that the latter in one half of the cross-section has the opposite direction compared with the other half. The electrical field between E1 and E2 produces a compression in the X-axis in the upper half of the rod, and a dilatation in the Y-axis (or vice versa). The field between E3 and E4 at the same instant produces a dilatation in the X-axis in the lower half, and a compression in the Y-axis (or vice versa).

By virtue of such deformations, periodical flexures are caused in the rod, and these result in resonance oscillations whenever the frequency of the exciting alternating potential equals one of the natural transversal periods of the rod. Bending of the rod takes place in the direction of the Z-axis.

(2). These transversal vibrations, though to a lesser degree, may be set up also when one of the pairs of electrodes, say, the upper one E1 E2 is removed. In this case, to be sure, the electrical field in the upper half has not the opposite direction, but a very small and nearly vanishing intensity compared with the field between E3 and E4. As a result, only the lower half of the rod is subject to deformation, and thus also a flexure is caused.

(3). In what way, according to the present invention, a rod orientated in relation to the crystal axes as shown in Figs. 2a and 2b, can be made to undergo transversal vibrations in the direction of the electrical axis is shown by way of example by the arrangement in Fig. 3, which comprises again four electrodes. But these, contradistinct to Fig. 2a, are not disposed in the Z-axis above each other, but in the Y-axis side by side. The electrodes are connected in pairs in a way as indicated by the + and − signs and are brought to an alternating potential source. The essential feature also in this case is that by virtue of the disposition and connection of the electrodes, an electrical field is produced in a volume element of the rod between the electrodes subject to variations both as to size and direction and of such non-uniformity that flexures and thereby transversal vibrations in the Z-axis are caused.

(4). The orientation of the rod by no means has to be chosen in a way as assumed in Figs. 1 to 3, indeed, according to the present invention also rods of different orientation can be induced to undergo transversal vibrations. This is shown by way of example in Fig. 4 where the longitudinal axis of the rod falls in the direction of the X-axis and not in the direction of the Y-axis as before shown. Also here four electrodes connected as shown may be employed, and these electrodes are disposed side by side in the X-axis. In this case, for instance, dilatations may be set up in the upper half of the rod as shown in the drawing in the portion of the rod between the electrodes E1 and E2, while simultaneously in the lower half a compression in the direction of the X-axis is produced, and this again results in flexural vibrations in the Y-axis. It is to be noted that in Figs. 3 and 4 the crystal extends beyond the electrodes for some distance. In this way loading of the crystal is accomplished and accordingly lower frequencies of flexural vibrations are obtained.

(5). In an arrangement as shown in Fig. 4, for the same reasons as mentioned in (2), transversal vibrations can be set up by means of two electrodes, E1, E2 or E3, E4, instead of by four electrodes, although less readily so.

(6). Turning the rod with an arrangement of the electrodes as illustrated in Fig. 4 an angle of 90 degrees about the X-axis, while the electrodes remain in their plane so that the Z-axis comes to coincide with the plane of the drawings, whereas the Y-axis is at right angles thereto, transversal vibrations falling in the direction of the optical axis will be produced with the same connection of the exciting electrodes.

(7). Torsional vibrations may be generated, for instance, in an arrangement as shown in Figs. 5a and 5b when the rod is orientated as shown in the drawing. The four electrodes which are disposed above one another with reference to the Z-axis are again connected in pairs according to like signs. The non-uniformity of the field is of such a nature that twisting about the longitudinal axis of the crystal is produced.

This may be explained more fully as follows. It is known in connection with the piezo-electric reversal effect, that what is decisive is the action of an electric field in the direction of the electric axis, that is to say, in the designation here used as a basis, in the X-axis, while an externally applied electrical field in the direction of the optical axis (Z) or in the direction of the neutral axis (Y) occasions no appreciable pressure alteration in the crystal. Hence, a potential difference set up between the electrodes E1 and E2 in the scheme shown in Fig. 5a is unable to occasion either a dilatation or a compression in the direction of the Y-axis. Since the electric field between the superposed electrodes E1 and E3 or between the electrodes E2 and E4, which are likewise superposed acts in the direction of the optical axis (Z), no compression or dilatation need be expected by these fields either in the various parts of the crystal. Indeed, appreciable mechanical forces can become effective only in direction X.

What electrical fields exist in direction X can be seen from the arrangement Fig. 5b. Appreciable components in direction X are furnished by the stray fields from the left and the right lateral surface of the electrode E1 to the left and the right-hand lateral face, respectively, of the electrode E3. The components of the force lines acting in the direction of axis X going from the left and the right lateral surface of the electrode E2 to the left and the right lateral surface of the electrode E4 have to be taken into account upon the posterior face of the crystal bar in the shape of compression a dilatation, as the case may be, in the direction of axis X.

Now, if the assumption be made that at a certain instant the components of the electric field acting at the right-hand lateral surface of E1 decreasing in the direction of the positive X-axis results in a compression in direction X, then a dilatation is obtained on the right lateral surface of electrode E3, further at the left lateral surface of electrode E1 a dilatation, and at the left lateral surface of the electrode E3 a compression.

Since the corresponding charges upon the posterior electrodes are exactly interchanged or transposed, it will be noted that for each compression upon the posterior face there is a dilatation upon the anterior face, and for each dilatation upon the posterior face a compression occurs upon the anterior face. And this is the typical tensional distribution for torsion.

What happens is that a small portion of the surface of the bar coordinated to the right-hand lateral surface of electrode E1 undergoes compression and is incidentally "lifted out" forwardly from the plane of oscillation. The same situation holds true of a small particle of the crystal surface coordinated to the left-hand lateral surface of the electrode E3, while small portions of surface upon the left-hand side of the electrode E1 and the right-hand side of electrode E3 are bent back. Since upon the posterior face the tensions are interchanged or reversed, there is obtained a "saddle surface" typical of torsion. Thus the crystal bar illustrated in Figs. 5a and 5b is twisted about its longitudinal axis.

The arrangements hereinbefore described are merely given by way of example. There are a great number of modifications conceivable. The essential feature of the present invention resides in the use of fields made non-uniform in definite manners and in definite directions for the piezo-electric production of deformations resulting in flexures or torsions. Instead of quartz, other piezo-electric crystals may be employed. The arrangement, number and connection of the electrodes must then be chosen so as to suit the particular piezo-electric properties of the kind of crystal that is used. Instead of rods, also other geometrical forms, for instance, plates or rings, may be employed.

(8). For instance, in Fig. 6a, an arrangement adapted to excite transversal vibrations in a quartz ring is shown. The optical axis is at right angles to the plane laid through the ring, in other words, it falls in the plane of the drawing. The electrical axes are indicated with their signs. In such a ring, the piezo-electric vector changes along the circumference as to size and direction. It is of opposite sign upon both sides of a neutral axis. Hence, in this case, non-uniform deformation required for the production of transversal vibrations in the plane of the ring can be produced by means of two electrodes E1 and E2 disposed at a neutral axis as shown in Fig. 6a.

The ring may also be excited in an electrical axis. In this case, four electrodes are suitably to be used, as shown in Fig. 6b, the electrodes having to be connected in pairs according to like signs.

The flexural oscillations in such a ring are to be defined in analogy with the flexural oscillations in a rod or bar. For this purpose one has to conceive the annular bar to be cut open at a certain cross-section and to be stretched out. For instance, if the ring Fig. 6a is cut open at one point and is then stretched or straightened out, in the middle of the bar or at one of the ends thereof and then, according to the position of the electrodes, axial orientation or flexure of the bar as in Figs. 2–4 is obtained. Hence, it is feasible to bend the ring out of its plane forwardly or rearwardly, although it is likewise possible to periodically compress it in its own plane or to expand it (draw it apart). In short, all of the considerations made with reference to bars or rods apply equally to a ring.

By adopting similar electrode arrangements as for rods, also rings may be caused to undergo torsional vibrations or transversal vibrations at right angles to the ring plane.

(9). An entirely different shape of the crystal together with an electrode arrangement suited for this case for the purpose of producing transversal vibrations is illustrated in Fig. 7.

(10). In the arrangements hereinbefore shown, either two or four electrodes have been provided. However, to insure stronger vibrations, it may often be an advantageous plan to use a greater number of electrodes whose fields are brought to act at different points of the rods, and which, by choosing proper polarities, may be made to assist each other in their effects.

(11). The presence of resonance between the frequency of transversal or torsional vibrations of the rod and the frequency of the alternating field that is applied as well as the ordinate number of the overtone or harmonic which is active, can be seen from the arising of luminous actions at the crystal rod when vibrating inside a vacuous space and from the luminous figure (see patent application G. 64366 VIII/21a4, dated May 15, 1925). The presence of a vacuum at the same time tends to diminish the damping of the rod.

As regards the technical and practical usefulness of the present invention the following may be pointed out:

1. Crystals which are undergoing transversal or torsional vibrations may be used for all such purposes for which heretofore longitudinal vibrations have been used.

2. Transversal vibrations and torsional vibrations which may be produced piezo-electrically according to the disclosures of the present invention, offer this advantage over longitudinal vibrations that a far larger range of frequencies of elastic natural vibrations is obtained. It is a well known fact that owing to the natural limitation of crystal sizes, quartz rods of more than 10 to 15 cm. length are practically not producible. The lowest longitudinal natural frequencies of such rods lie between 20000 and 30000 Hertz units. In the case of transversal natural frequencies, the lowest figures for rods of equal length range between 1000 and 3000 Hertz, in other words, they fall inside the audible range of waves.

3. In Figs. 3 and 4, it is shown how the crystal itself may be utilized for loading so that lower frequencies may be obtained.

4. Quartz rods of low natural frequency can be used for the same purpose for which tuning forks are employed. Hence, when excited piezo-electrically, they can be used as high-precision acoustic standards.

5. Insofar as the radio frequency range in radio-telegraphy is concerned, this advantage can be insured that the transversal natural frequencies, owing to their far higher ordinate numbers fall much closer together inside this range than the longitudinal natural frequencies. Hence, when using transversal vibrations, inside the same range, a far larger number of standard frequencies are available than is true of longitudinal vibrations.

Having thus described our invention, what we claim is:

1. An arrangement for producing torsional vibrations in a piezo-electric crystal comprising a piezo-electric crystal element having a pair of parallel electrode faces lying substantially in planes parallel to the optical and electrical axes of the mother crystal from which the crystal element was obtained, a pair of electrodes adjacent one of said electrode faces and arranged in a line parallel to the optical axis of the crystal from which said element was obtained, and another pair of electrodes similarly arranged on the other electrode face of said crystal, the electrodes opposite each other facing different electrode faces of said crystal element being excited with alternating potentials of instantaneously different polarity whereby the leakage electrostatic fields across said electrode faces cause compressive and dilatative stresses in adjacent portions of the crystal element such that said crystal element vibrates torsionally with respect to its electrical axis.

2. An arrangement for producing torsional vibrations in a crystal, said arrangement comprising a piezo-electric crystal element having an electrode face substantially parallel to an optical and to an electrical axis of the mother crystal from which said element was obtained, and a pair of electrodes disposed adjacent said electrode face and separated in a direction parallel to the optical axis of said crystal element, said electrodes being subjected to alternating potentials of instantaneous opposite polarity whereby leakage fields across the electrode surface of said element produce compressive and dilatative stresses in diagonally disposed portions of said electrode surface, whereby a resultant torsional stress is produced in said crystal about the electrical axis thereof.

ERICH GIEBE.
ADOLF SCHEIBE.